United States Patent
Shimada (10) Patent No.: US 11,592,343 B2
(45) Date of Patent: Feb. 28, 2023

(54) TEMPERATURE SENSOR MALFUNCTION DIAGNOSIS APPARATUS AND TEMPERATURE SENSOR MALFUNCTION DIAGNOSIS METHOD

(71) Applicant: SUBARU CORPORATION, Tokyo (JP)

(72) Inventor: Ringo Shimada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 420 days.

(21) Appl. No.: 16/837,024

(22) Filed: Apr. 1, 2020

(65) Prior Publication Data
US 2020/0326245 A1 Oct. 15, 2020

(30) Foreign Application Priority Data
Apr. 9, 2019 (JP) .............................. JP2019-073991

(51) Int. Cl.
| | | |
|---|---|---|
| G01K 15/00 | (2006.01) | |
| B60R 16/04 | (2006.01) | |
| G01K 13/00 | (2021.01) | |

(52) U.S. Cl.
CPC ............ G01K 15/007 (2013.01); B60R 16/04 (2013.01); G01K 13/00 (2013.01)

(58) Field of Classification Search
CPC ....... G01K 15/007; G01K 13/00; B60R 16/04
See application file for complete search history.

(56) References Cited

U.S. PATENT DOCUMENTS

2017/0003179 A1* 1/2017 Jin .......................... G01K 15/00

FOREIGN PATENT DOCUMENTS

| CN | 107796534 A | * | 3/2018 | ............. B60L 3/003 |
| DE | 102021005769 A1 | * | 1/2022 | |
| JP | 2008-308124 A | | 12/2008 | |
| JP | 2017100482 A | * | 6/2017 | |

\* cited by examiner

Primary Examiner — Mirellys Jagan
(74) Attorney, Agent, or Firm — McDermott Will & Emery LLP (57) ABSTRACT

A temperature sensor malfunction diagnosis apparatus is provided in a vehicle that includes a device, a refrigerant circuit, an electric pump, a battery, and a temperature sensor, and configured to diagnose malfunction of the temperature sensor. The temperature sensor malfunction diagnosis apparatus includes a pump driver and a malfunction diagnosis unit. The pump driver is configured to drive the electric pump after stopping of driving of the vehicle, on the basis of the battery as a power supply. The malfunction diagnosis unit is configured to perform a malfunction diagnosis of the temperature sensor, on a condition that a charged time reaches a temperature converging time of the temperature sensor while the electric pump is driven. The charged time is a time during which charging of the battery is performed from start of the charging of the battery.

19 Claims, 7 Drawing Sheets

FIG. 7

TEMPERATURE SENSOR MALFUNCTION DIAGNOSIS APPARATUS AND TEMPERATURE SENSOR MALFUNCTION DIAGNOSIS METHOD

CROSS-REFERENCE TO RELATED APPLICATIONS

The present application claims priority from Japanese Patent Application No. 2019-073991 filed on Apr. 9, 2019, the entire contents of which are hereby incorporated by reference.

BACKGROUND

The technology relates to a temperature sensor malfunction diagnosis apparatus and a temperature sensor malfunction diagnosis method.

Japanese Unexamined Patent Application Publication No. 2008-308124 discloses a technique that drives a water pump during charging, performed on the basis of an external power supply, of a secondary battery provided in a so-called plug-in hybrid vehicle.

SUMMARY

An aspect of the technology provides a temperature sensor malfunction diagnosis apparatus provided in a vehicle that includes a device, a refrigerant circuit, an electric pump, a battery, and a temperature sensor, and configured to diagnose malfunction of the temperature sensor. The refrigerant circuit is configured to circulate a refrigerant through the device. The electric pump is provided in the refrigerant circuit. The battery is configured to be charged after stopping of driving of the vehicle. The temperature sensor is configured to measure a temperature of the device. The temperature sensor malfunction diagnosis apparatus includes a pump driver and a malfunction diagnosis unit. The pump driver is configured to drive the electric pump after the stopping of the driving of the vehicle. The malfunction diagnosis unit is configured to perform a malfunction diagnosis of the temperature sensor, on a condition that a charged time reaches a temperature converging time of the temperature sensor while the electric pump is driven. The charged time is a time during which charging of the battery is performed from start of the charging of the battery.

An aspect of the technology provides a temperature sensor malfunction diagnosis method that includes: driving an electric pump after stopping of driving of a vehicle, in which the electric pump is provided in a refrigerant circuit that is configured to circulate a refrigerant through a device; and performing a malfunction diagnosis of a temperature sensor, on a condition that a charged time reaches a temperature converging time of the temperature sensor while the electric pump is driven. The temperature sensor is configured to measure a temperature of the device. The charged time is a time during which charging of a battery serving as a power supply of the electric pump is performed from start of the charging of the battery.

An aspect of the technology provides a temperature sensor malfunction diagnosis apparatus provided in a vehicle that includes a device, a refrigerant circuit, an electric pump, a battery, and a temperature sensor, and configured to diagnose malfunction of the temperature sensor. The refrigerant circuit is configured to circulate a refrigerant through the device. The electric pump is provided in the refrigerant circuit. The battery is configured to be charged after stopping of driving of the vehicle. The temperature sensor is configured to measure a temperature of the device. The temperature sensor malfunction diagnosis apparatus includes circuitry configured to: drive the electric pump after the stopping of the driving of the vehicle, on the basis of the battery as a power supply; and perform a malfunction diagnosis of the temperature sensor, on a condition that a charged time reaches a temperature converging time of the temperature sensor while the electric pump is driven. The charged time is a time during which charging of the battery is performed from start of the charging of the battery.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Figure 1:
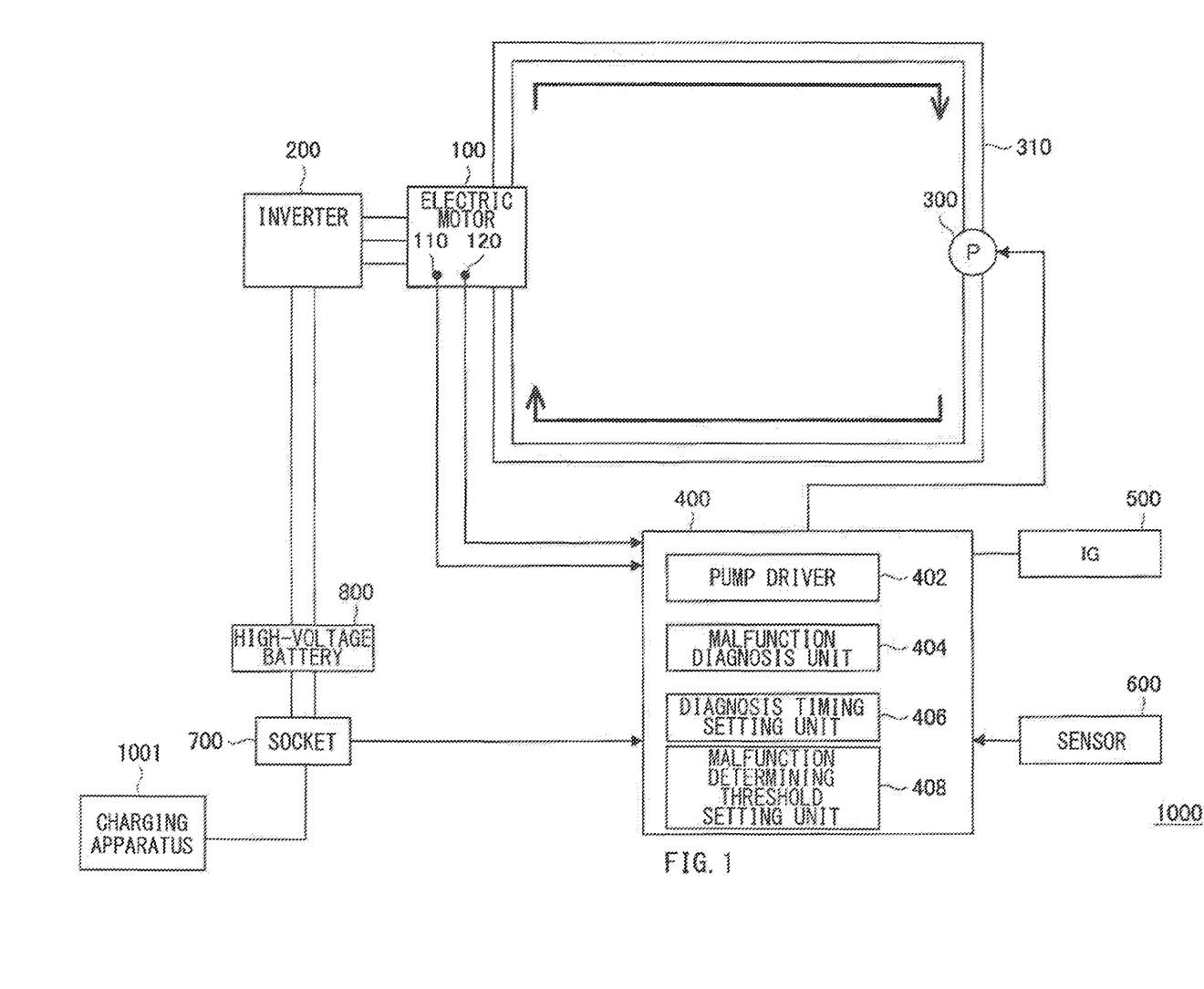
FIG. 1 is a schematic diagram illustrating an example of a configuration of a system according to one example embodiment of the technology.

FIG. 1 is a schematic diagram illustrating an example of a configuration of a system (hereinafter may be simply referred to as a "system") 1000 according to an example embodiment of the technology. The system 1000 according to an example embodiment may be mounted on a hybrid vehicle that includes an electric motor 100 as a drive source, in addition to an unillustrated internal combustion engine. The electric motor 100 may be directed to traveling of the vehicle, and may be driven by electric power charged in a high-voltage battery 800. Note that a vehicle to which any embodiment of the technology is applicable is not limited to the hybrid vehicle. Any embodiment of the technology may be applied to an electric vehicle that includes an electric motor as a drive source.

Referring to FIG. 1, the system 1000 may include a refrigerant circuit 310. The refrigerant circuit 310 includes an electric pump (hereinafter may be simply referred to as a "pump") 300 that drives a refrigerant. By driving the pump 300, the refrigerant circuit 310 causes the refrigerant to circulate the refrigerant circuit 310. Non-limiting examples of the refrigerant may include a cooling fluid and a cooling oil.

In one embodiment, the high-voltage battery 800 may serve as a "battery". In one embodiment, the electric pump 300 may serve as an "electric pump". In one embodiment, the refrigerant circuit 310 may serve as a "refrigerant circuit".

The refrigerant circuit 310 may be coupled to the electric motor (hereinafter may be simply referred to as a "motor") 100. The motor 100 may be cooled by the refrigerant that flows in the refrigerant circuit 310. In one embodiment, the motor 100 may serve as a "device". The motor 100 may be cooled by the refrigerant in an example embodiment, although a target to be cooled by the refrigerant is not limited to the motor. In some embodiments, an inverter 200 that controls a current to be supplied to the motor 100 may be cooled by the refrigerant. The inverter 200 may perform a current control, including converting a DC current supplied from the high-voltage battery 800 into an AC current and converting an AC current generated by the motor 100 into the DC current.

The system 1000 may include ECU 400 that controls the system 1000 as a whole. The ECU 400 may be coupled to devices including the pump 300, an ignition switch (IG) 500, an ambient temperature sensor 600, a socket 700, and the high-voltage battery 800. The ambient temperature sensor 600 may detect an ambient temperature or any temperature equivalent to the ambient temperature. The socket 700 may be configured to be coupled to a charging apparatus (i.e., an external power supply) 1001 provided outside the vehicle.

The ECU 400 may also be coupled to one or more temperature sensors. In an example embodiment, the ECU 400 may be coupled to two temperature sensors 110 and 120. The temperature sensors 110 and 120 each detect a temperature of the motor 100. An example embodiment may detect a malfunction state of each of the temperature sensors 110 and 120. In one embodiment, the temperature sensors 110 and 120 each may serve as a "temperature sensor".

The ECU 400 includes a pump driver 402 and a malfunction diagnosis unit 404. The ECU 400 may also include a diagnosis timing setting unit 406 and a malfunction determining threshold setting unit 408. The pump driver 402 drives the pump 300. The malfunction diagnosis unit 404 performs a malfunction diagnosis of the temperature sensors 110 and 120. The diagnosis timing setting unit 406 may set a diagnosis timing at which the malfunction diagnosis is to be started, on the basis of a charged time. The malfunction determining threshold setting unit 408 may set a malfunction determining threshold, on the basis of the charged time. In some embodiments, a dedicated circuit or hardware may configure all or a part of the elements provided in the ECU 400. In some embodiments, a central processing unit configuring the ECU 400 and a program or software that causes the central processing unit to work may configure all or a part of the elements provided in the ECU 400.

In one embodiment, the pump driver 402 may serve as a "pump driver". In one embodiment, the malfunction diagnosis unit 404 may serve as a "malfunction diagnosis unit". In one embodiment, the diagnosis timing setting unit 406 may serve as a "diagnosis timing setting unit". In one embodiment, the malfunction determining threshold setting unit 408 may serve as a "malfunction determining threshold setting unit". In one embodiment, the pump driver 402, the malfunction diagnosis unit 404, the diagnosis timing setting unit 406, and the malfunction determining threshold setting unit 408 may serve as a "temperature sensor malfunction diagnosis apparatus".

Figure 2:
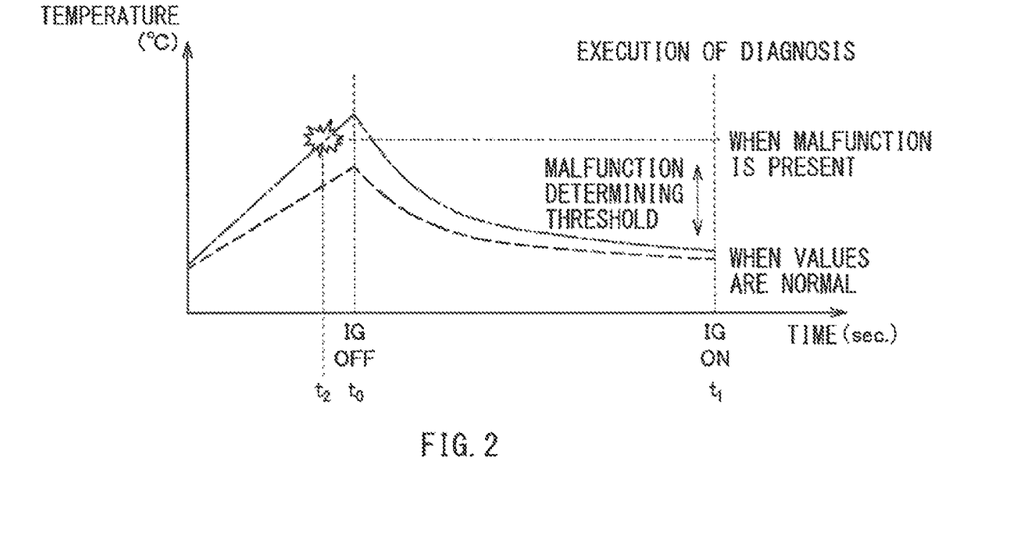
FIG. 2 is a characteristic diagram illustrating an example of a technique of diagnosing malfunction states of temperature sensors.

To detect the malfunction states of the respective temperature sensors, a comparison may be made of detection values of the two temperature sensors that make respective temperature transitions that are close to each other. Upon making a diagnosis of the malfunction states of the respective temperature sensors based on the comparison of the detection values, the diagnosis may be performed on the basis of a situation in which the detection values of the two temperature sensors converge to respective temperatures that are close to each other, in order to prevent making a wrong diagnosis caused by temperature variation attributed to traveling of the vehicle. For example, the diagnosis may be performed after soaking of the vehicle, where the vehicle is left unattended after stopping of driving of the vehicle. FIG. 2 is a characteristic diagram illustrating an example of a technique of diagnosing malfunction states of temperature sensors.

Referring to FIG. 2, a characteristic denoted by a dashed-dotted line indicates the detection value of one of the temperature sensors 110 and 120 (for example, the detection value of the temperature sensor 110), whereas a characteristic denoted by a broken line indicates the detection value of the other of the temperature sensors 110 and 120 (for example, the detection value of the temperature sensor 120). The traveling of the vehicle causes the detection values of the respective temperature sensors 110 and 120 to increase due to heat generated by the motor 100, for example. The detection values of the respective temperature sensors 110 and 120, however, decrease in a case where the ignition switch 500 is turned off (i.e., a time t0) and the vehicle is stopped accordingly. In one example, if the diagnosis is to be performed at a time t1, the detection values of the two temperature sensors 110 and 120 decrease until the time t1, owing to cooling based on the refrigerant. The time t1 is a timing after a time required to sufficiently cool the refrigerant in the refrigerant circuit 310 has elapsed from the turning off of the ignition switch 500. Further, if malfunction has occurred in one of the temperature sensors 110 and 120 (for example, the temperature sensor 110) at a time t2, the detection value of the temperature sensor 110 no longer indicates a variation in the detection value based on a normal state, which can lead to a case where, for example, the temperature sensor 110 keeps on maintaining its detection value based on the timing at the time t2. In this case, a difference thus occurs between the detection value of the temperature sensor 110 at the timing of the time t1 and the detection value of the temperature sensor 120 at the timing of the time t1. Accordingly, the malfunction determining threshold may be set in advance. The temperature sensor 110 may be diagnosed as malfunctioning, if the difference between the detection value of the temperature sensor 110 at the timing of the time t1 and the detection value of the temperature sensor 120 at the timing of the time t1 is greater than the malfunction determining threshold, i.e., if a difference between the temperatures at the timing of the time t1 exceeds the malfunction determining threshold.

It is to be noted that, in the malfunction diagnosis illustrated by way of example in FIG. 2, the malfunction determining threshold is set in consideration of: the temperature variation attributed to traveling of the vehicle; and a maximum value of an error in characteristics of the temperature sensors. In this example case, a time until which the diagnosis is to be performed (i.e., a time from the turning off of the ignition switch 500 (t0) to the execution of the diagnosis (t1)) is set to a longer time and the malfunction determining threshold is set to a larger value. However, under an actual usage environment, setting the time until which the diagnosis is to be performed to the longer time not only makes it necessary to stand by for the execution of the diagnosis during the set time, but also prevents the malfunction diagnosis from being performed and thus decreases the frequency of the execution of the diagnosis in a case where the ignition switch 500 is turned on again and the vehicle is thus started again during the time until which the diagnosis is to be performed. On the other hand, setting the malfunction determining threshold to the larger value can make malfunction undetectable for a certain length of time after the occurrence of the malfunction, in a case where, for example, any of the temperature sensors suffers from malfunction in which the detection value thereof is fixed to an intermediate value.

A description is given now of the malfunction diagnosis of the temperature sensors 110 and 120 according to an example embodiment.

In an example embodiment, the pump 300 is driven after the ignition switch 500 is turned off to accelerate a time at which a diagnosis of reasonableness is to be performed. In other words, the pump 300 is driven to allow the detection values of the respective temperature sensors 110 and 120 to be decreased faster and thereby to allow those detection values to be converged to the respective temperatures that are close to each other at an earlier timing. Accordingly, it is possible to shorten the time until which the diagnosis is to be performed (i.e., accelerate the execution of the diagnosis) and to set the malfunction determining threshold to a smaller value.

Figure 3:
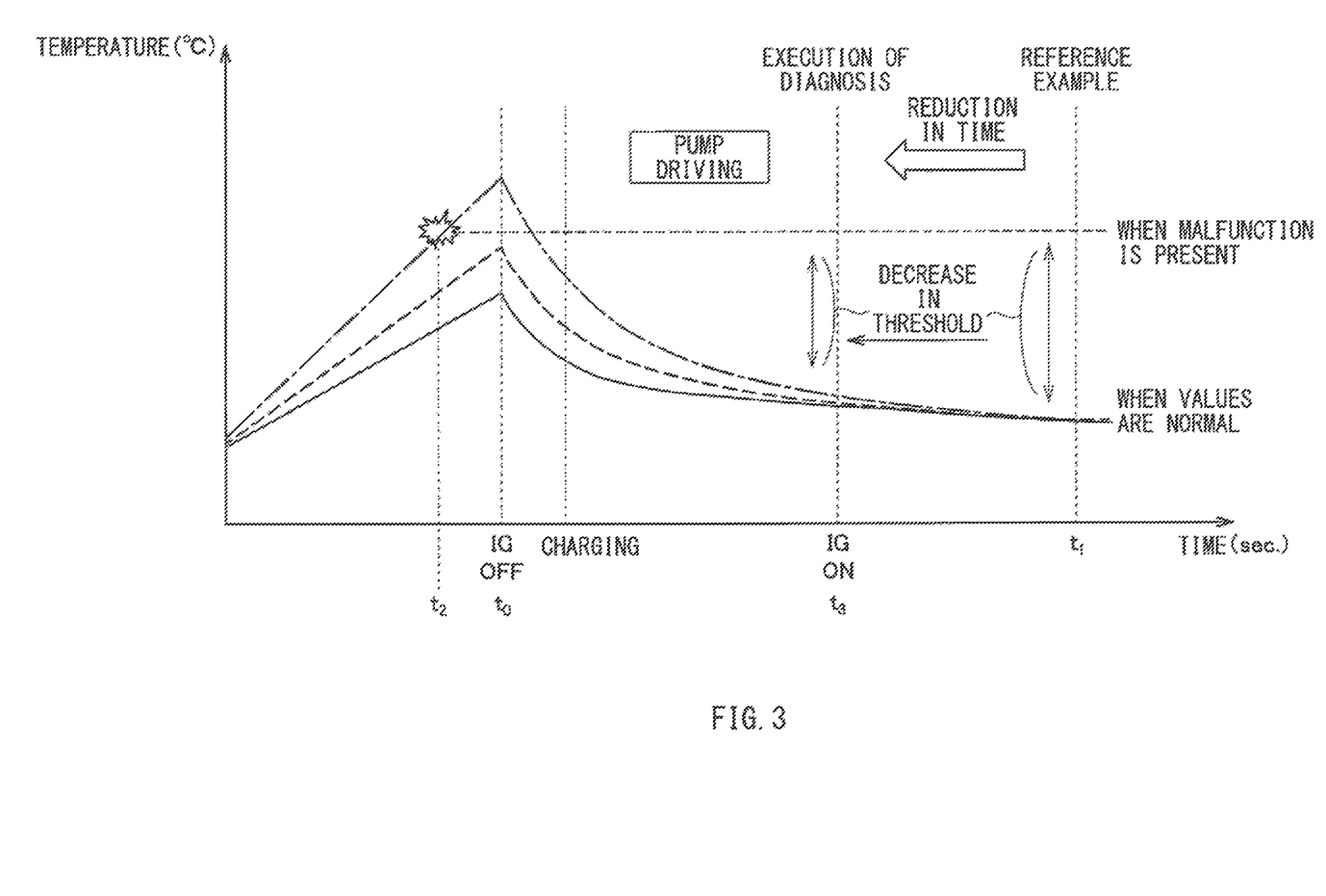
FIG. 3 is a characteristic diagram illustrating a technique of diagnosing malfunction of the temperature sensors according to one example embodiment of the technology.

FIG. 3 is a characteristic diagram illustrating a technique of diagnosing the malfunction of the temperature sensors 110 and 120 according to an example embodiment of the technology. In an example embodiment illustrated in FIG. 3, the pump 300 may be driven and the high-voltage battery 800 may be charged in a case where a chargeable time is longer than a temperature converging time of the temperature sensors 110 and 120. In some embodiments, the chargeable time may be calculated on the basis of a state of charge (SOC) of the high-voltage battery 800. Referring to FIG. 3, a characteristic denoted by a dashed-dotted line indicates the detection value of one of the temperature sensors 110 and 120 (for example, the detection value of the temperature sensor 110), whereas a characteristic denoted by a broken line indicates the detection value of the other of the temperature sensors 110 and 120 (for example, the detection value of the temperature sensor 120). A characteristic denoted by a solid line indicates a temperature of the refrigerant.

As described previously, driving the pump 300 allows the detection values of the respective temperature sensors 110 and 120 to be converged at an earlier timing. As illustrated in FIG. 3, the detection values of the respective temperature sensors 110 and 120 become equal or substantially equal to the temperature of the refrigerant at the timing of a time t3, in a case where the pump 300 is driven. Accordingly, it is possible to perform the malfunction diagnosis of the temperature sensors 110 and 120 at the timing of the time t3. In contrast, in a case where the pump 300 is not driven, the detection values of the respective temperature sensors 110 and 120 become equal or substantially equal to the temperature of the refrigerant at the timing of the time t1 that is after the time t3. Accordingly, driving the pump 300 makes it possible to advance the timing at which the diagnosis is to be performed by the degree corresponding to a time period from the time t3 to the time t1, and thereby to accelerate the execution of the diagnosis. The time t1 in FIG. 2 and the time t1 in FIG. 3 may be the same.

Hence, the diagnosis has been already performed at the timing of the time t3 even if the ignition switch 500 is turned on after or immediately after the time t3, making it possible to suppress the decrease in the frequency of the execution of the diagnosis.

In addition, a difference occurs between the detection value of the temperature sensor 110 at the timing of the time t3 and the detection value of the temperature sensor 120 at the timing of the time t3 (i.e., an abnormal value appears), if malfunction has occurred in one of the temperature sensors 110 and 120 (for example, the temperature sensor 110) at the time t2 and the temperature sensor 110 thus keeps on maintaining its detection value based on the timing at the time t2. However, the difference between the detection values of the respective temperature sensors 110 and 120 at the timing of the time t3 in a case where the pump 300 is driven is smaller than the difference between the detection values of the respective temperature sensors 110 and 120 at the timing of the time t1 in a case where the pump 300 is not driven. Accordingly, it is possible to make the malfunction determining threshold at the time t3 smaller.

Hence, driving the pump 300 makes it possible to accelerate the execution of the diagnosis and to allow the malfunction determining threshold to be small in value, as compared with a case where the pump 300 is not driven.

Figure 4:
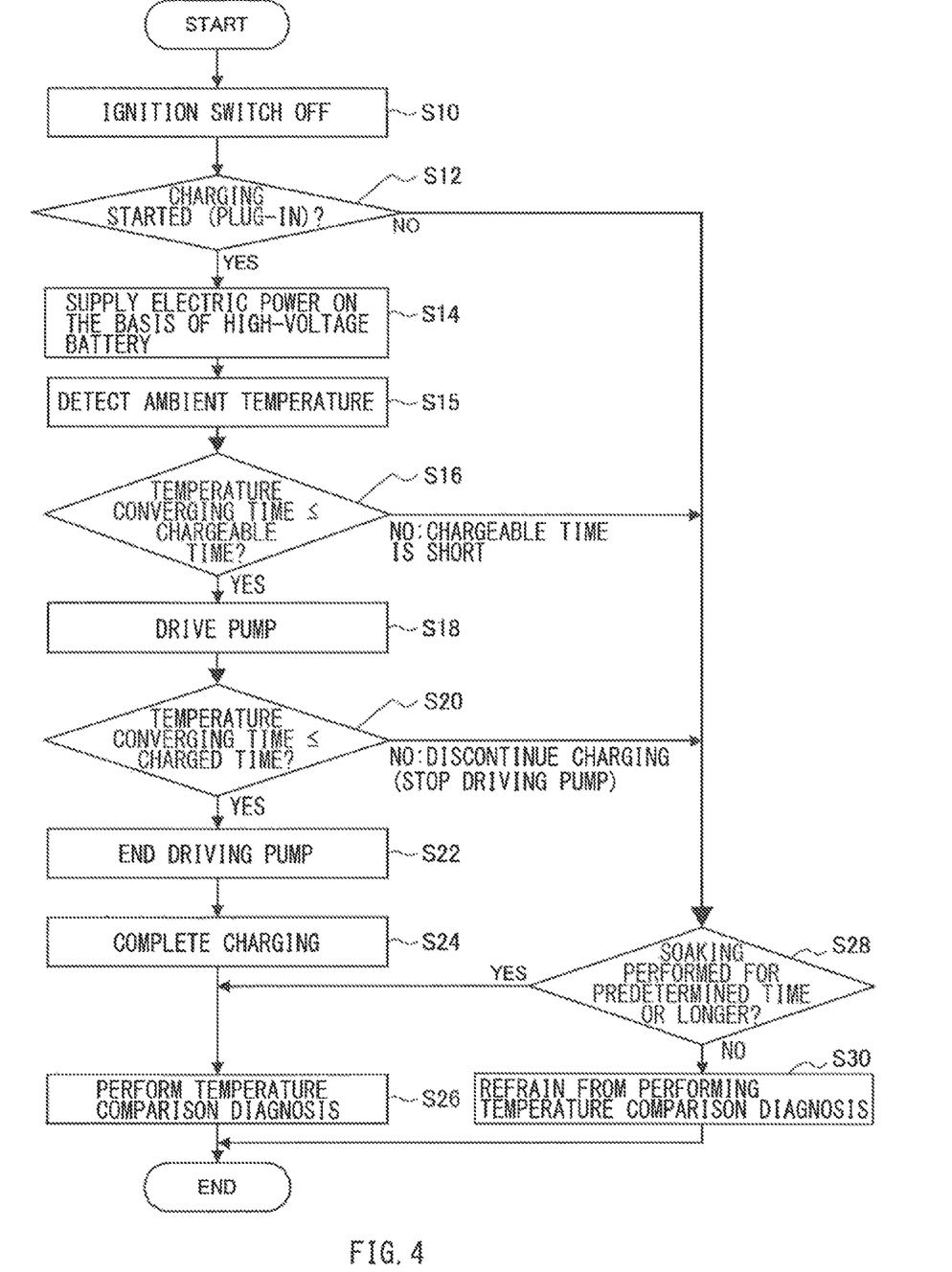
FIG. 4 is a flowchart illustrating an example of a process in which a chargeable time is longer than a temperature converging time of the temperature sensors.

A description is given next of an example of a process to be performed by the system 1000 according to an example embodiment. First, with reference to a flowchart illustrated in FIG. 4, a description is given of an example in which the chargeable time of the high-voltage battery 800 is equal to or longer than the temperature converging time of the temperature sensors 110 and 120. FIG. 4 is a flowchart illustrating an example of the process in which the chargeable time is equal to or longer than the temperature converging time. The process illustrated by way of example in FIG. 4 may be executed by the ECU 400.

The process may start (START) with step S10 first. In step S10, turning off of the ignition switch 500 by a driver of the vehicle may be detected, and the driving of the vehicle may be stopped. Thereafter, in step S12, whether the charging of the high-voltage battery 800 is started may be determined. The process may proceed to step S14 (step S12: YES) if the charging is determined as being started. For example, the charging may be determined as being started on a condition that: the socket 700 is coupled to a charging station (e.g., a power feeding plug provided at the charging station is inserted into the socket 700 of the vehicle, i.e., "plug-in" of the power feeding plug into the socket 700 is performed); and the ECU 400 detects the plug-in. In step S14, supply of electric power may be performed on an electrical system including the motor 100, on the basis of the high-voltage battery 800.

Thereafter, in step S15, the ambient temperature or any temperature equivalent to the ambient temperature may be detected on the basis of an output value obtained by the ambient temperature sensor 600. Thereafter, in step S16, the temperature converging time of the temperature sensors 110 and 120 and the chargeable time may be compared to determine whether the chargeable time is equal to or longer than the temperature converging time of the temperature sensors 110 and 120. If the chargeable time is determined as being equal to or longer than the temperature converging time (step S16: YES), the process may proceed to step S18. In step S18, the pump 300 may be driven by the pump driver 402. Accordingly, the detection values of the respective temperature sensors 110 and 120 come close to the temperature of the refrigerant, making it possible to accelerate the timing at which the detection values of the temperature sensors 110 and 120 converge to the respective temperatures that are close to each other.

Figure 5:
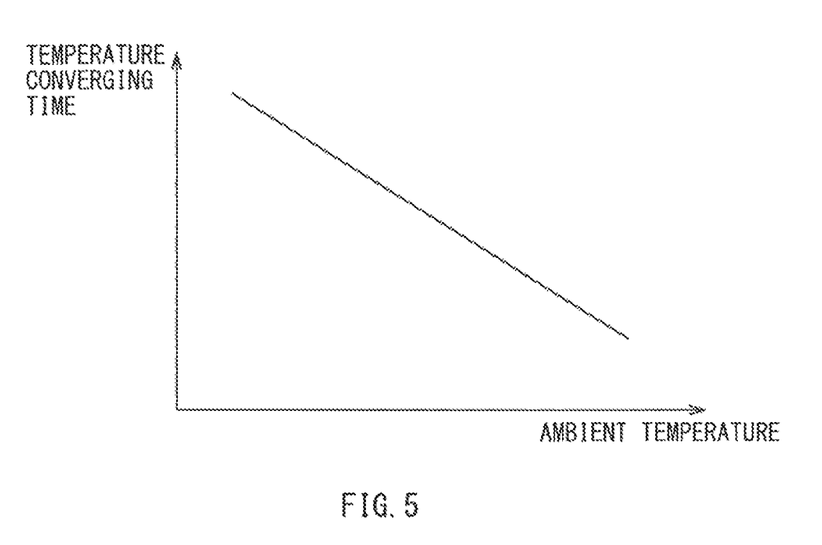
FIG. 5 is a schematic diagram illustrating an example of a map that defines a relationship between the temperature converging time and an ambient temperature.

For example, in step S16, the temperature converging time may be determined on the basis of matching, and may be determined as a time required to cause the temperature detected by any temperature sensor to be converged. In an example embodiment, the temperature converging time may be a time required to cause the detection values of the two temperature sensors 110 and 120 to be converged to the respective temperatures that are close to each other. In some embodiments, the temperature converging time may be determined on the basis of the ambient temperature. FIG. 5 is a schematic diagram illustrating an example of a map that defines a relationship between the temperature converging time represented by the vertical axis and the ambient temperature represented by the horizontal axis. Referring to FIG. 5, the temperature converging time may become shorter as the ambient temperature is higher. One reason is that, at the time t0 at which the ignition switch 500 is turned off, the temperature of the refrigerant is increased due to the heat generated by the traveling of the vehicle and thus a time required for the temperature of the refrigerant to converge becomes shorter as the ambient temperature is higher as compared with a case where the ambient temperature is low, and that the temperature converging time of the temperature sensors 110 and 120 becomes shorter consequently. Note that the chargeable time in step S16 is a time during which the charging is continuable up to full charge of the high-voltage battery 800, and may be determined on the basis of the SOC of the high-voltage battery 800. For example, the chargeable time may become longer as the SOC is lower relative to the fully-charged level.

If the chargeable time is determined as being shorter than the temperature converging time of the temperature sensors 110 and 120 (step S16: NO), it is not possible to charge the high-voltage battery 800 throughout the entire temperature converging time of the temperature sensors 110 and 120, and hence it is not possible to continue driving the pump 300 until the detection values of the respective temperature sensors 110 and 120 are converted. Accordingly, the process may proceed to step S28 without driving the pump 300, if the chargeable time is determined as not satisfying the temperature converging time of the temperature sensors 110 and 120 (step S16: NO).

Thereafter, in step S20, the temperature converging time of the temperature sensors 110 and 120 and the charged time may be compared to determine whether the charged time is equal to or longer than the temperature converging time of the temperature sensors 110 and 120. In other words, the temperature converging time and the charged time may be compared to determine whether the charged time reaches the temperature converging time of the temperature sensors 110 and 120. If the charged time is determined as reaching the temperature converging time (step S20: YES), the process may proceed to step S22. In step S22, the driving of the pump 300 may be stopped, allowing the malfunction diagnosis of the temperature sensors 110 and 120 to be performed.

Thereafter, in step S24, the charging of the high-voltage battery 800 is completed. If none of the temperature sensors 110 and 120 suffer from the malfunction and are normal at this point, the detection values of the respective temperature sensors 110 and 120 both coincide or substantially coincide with the temperature of the refrigerant and are converged to the respective temperatures that are close to each other. Thereafter, in step S26, a temperature comparison diagnosis of the temperature sensors 110 and 120 may be performed by the malfunction diagnosis unit 404. If the difference between the detection values of the respective temperature sensors 110 and 120 exceeds the malfunction determining threshold described above, the malfunction diagnosis unit 404 may determine that the malfunction occurs in corresponding one of the temperature sensors 110 and 120.

If the chargeable time is determined in step S16 as being shorter than the temperature converging time of the temperature sensors 110 and 120 (step S16: NO), the process may proceed to step S28. In this case, the chargeable time is short and hence it is not possible to drive the pump 300 throughout a time that is effective in converging the detection values of the respective temperature sensors 110 and 120. Accordingly, in step S28, whether the soaking is performed for a predetermined time or longer after the turning off of the ignition switch 500 is determined. If the soaking is determined as being performed for the predetermined time or longer (step S28: YES), the process may proceed to step S26. In step S26, the temperature comparison diagnosis of the temperature sensors 110 and 120 may be performed by the malfunction diagnosis unit 404. For example, the soaking of the predetermined time or longer may be equivalent to an elapsed time until which the temperature sensors 110 and 120 converge to the temperature of the refrigerant naturally, i.e., converge to the temperature of the refrigerant in a state in which no circulation of the refrigerant is present. If the soaking is determined as being not performed for the predetermined time or longer (step S28: NO), the process may proceed to step S30. In step S30, the temperature comparison diagnosis may not be performed for a current routine, and the execution of the diagnosis may be kept on standby until the predetermined time is elapsed. The process may end (END) after step S26 or S30.

If the charged time is determined in step S20 as not reaching the temperature converging time (step S20: NO), the process may proceed to step S28. For example, the charged time may be determined as not satisfying the temperature converging time, in a case where the charging plug is pulled out from the socket 700 while the charging is performed and thus the charging is discontinued. In this case, the driving of the pump 300 may be stopped due to the discontinuation of the charging and the process steps in and after step S28 may be performed thereafter.

If the charging of the high-voltage battery 800 is determined in step S12 as not being started (step S12: NO), the process may proceed to step S28 without driving the pump 300, and the process steps in and after step S28 may be performed thereafter.

Figure 6:
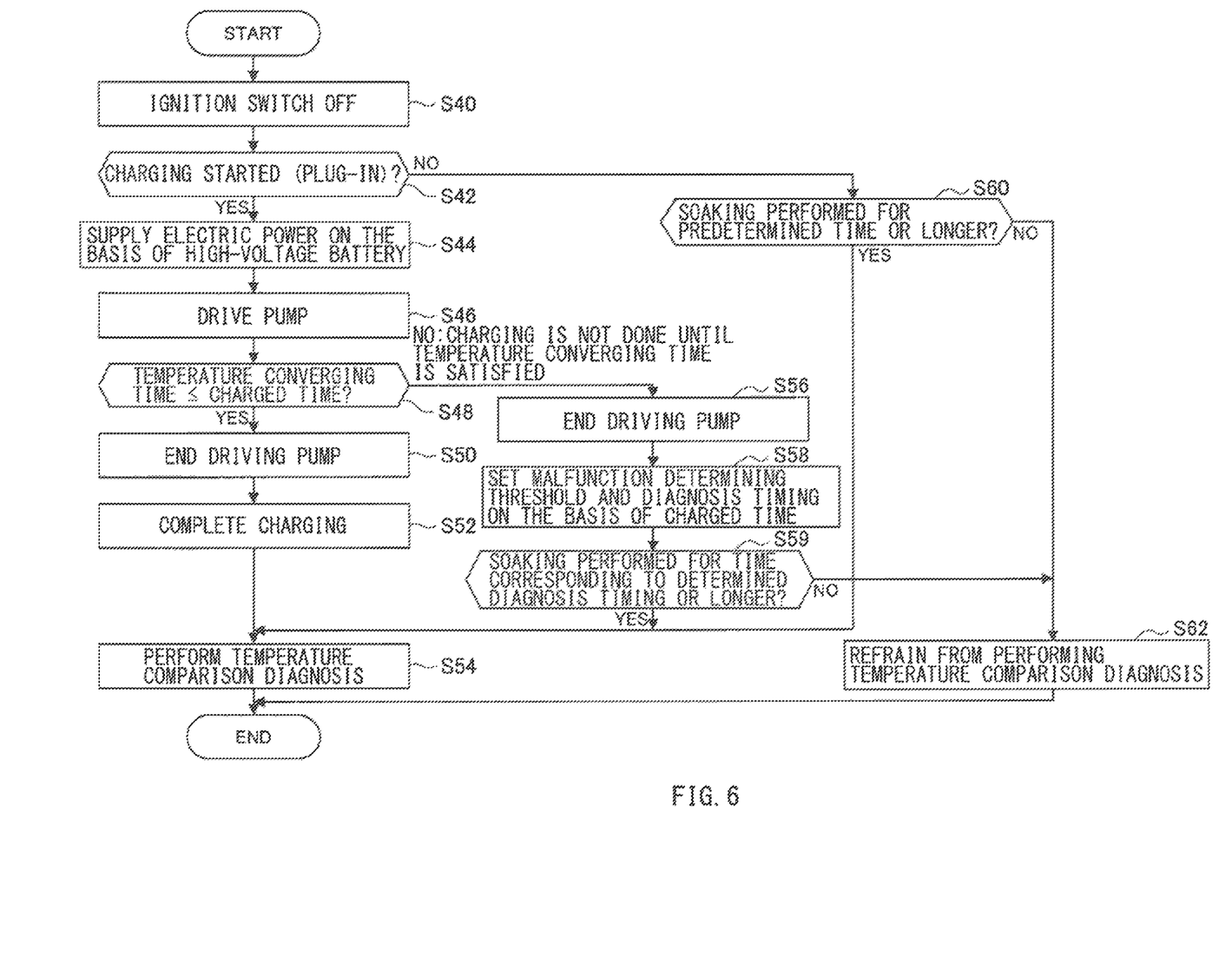
FIG. 6 is a flowchart illustrating an example of a process that performs the diagnosis where the chargeable time is short.

The process illustrated in FIG. 4 is based on an example embodiment where the pump 300 is driven to accelerate the diagnosis timing at which the diagnosis is to be started, in a case where the chargeable time is the same as or longer than the temperature converging time. An alternative example embodiment makes it possible to perform the diagnosis even in a case where the chargeable time does not satisfy the temperature converging time, by mapping the malfunction determining threshold and the diagnosis timing in accordance with a driving time during which the pump 300 is driven. Thus, the alternative example embodiment also allows the malfunction determining threshold to be decreased and allows for the acceleration of the diagnosis timing. FIG. 6 is a flowchart illustrating an example of a process that performs the diagnosis even where the chargeable time is short. The process illustrated by way of example in FIG. 6 may be executed by the ECU 400.

The process may start (START) with step S40 first. In step S40, turning off of the ignition switch 500 by the driver of the vehicle may be detected, and the driving of the vehicle may be stopped. Thereafter, in step S42, whether the charging of the high-voltage battery 800 is started may be determined. The process may proceed to step S44 (step S42: YES) if the charging is determined as being started. In step S44, the supply of electric power may be performed on the basis of the high-voltage battery 800.

Thereafter, in step S46, the pump 300 may be driven by the pump driver 402. Thereafter, in step S48, the temperature converging time of the temperature sensors 110 and 120 and the charged time may be compared to determine whether the charged time reaches the temperature converging time of the temperature sensors 110 and 120. If the charged time is determined as reaching the temperature converging time (step S48: YES), the process may proceed to step S50. In step S50, the driving of the pump 300 may be stopped, allowing the malfunction diagnosis of the temperature sensors 110 and 120 to be performed.

Thereafter, in step S52, the charging of the high-voltage battery 800 is completed. Thereafter, in step S54, the temperature comparison diagnosis of the temperature sensors 110 and 120 may be performed by the malfunction diagnosis unit 404. If the difference between the detection values of the respective temperature sensors 110 and 120 exceeds the malfunction determining threshold described above, the malfunction diagnosis unit 404 may determine that the malfunction occurs in corresponding one of the temperature sensors 110 and 120.

If the charged time is determined in step S48 as not reaching the temperature converging time (step S48: NO), the process may proceed to step S56. For example, the charged time may be determined as not satisfying the temperature converging time, in a case where the charging plug is pulled out from the socket 700 while the charging is performed and thus the charging is discontinued. In step S56, the driving of the pump 300 may be stopped due to the discontinuation of the charging. Thereafter, the process may proceed to step S58 in which the malfunction determining threshold and the diagnosis timing (e.g., the time t3 illustrated in FIG. 3) both based on the charged time may be set. In some embodiments, the malfunction determining threshold setting unit 408 may set the malfunction determining threshold, and the diagnosis timing setting unit 406 may set the diagnosis timing.

Note that the driving of the pump 300 is stopped in step S56, but the pump 300 has been driven prior to step S56. Accordingly, the detection values of the respective temperature sensors 110 and 120 each make a temperature transition that comes close to the temperature of the refrigerant, by the degree corresponding to a time period during which the pump 300 has been driven. Hence, it is possible to accelerate a timing at which the temperature comparison diagnosis is to be performed and allow the malfunction determining threshold to be decreased as well, by the degree corresponding to a time period during which the pump 300 has been driven.

Figure 7:
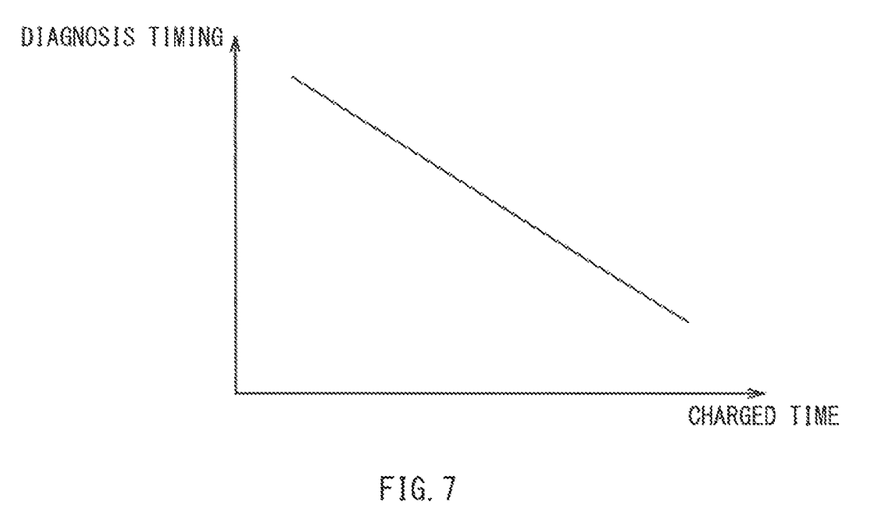
FIG. 7 is a schematic diagram illustrating an example of a map that may be used upon setting a soaking time in step S58.

In some embodiments, a map may be used to set the malfunction determining threshold and the diagnosis timing in step S58. FIG. 7 is a schematic diagram illustrating an example of the map that may be used upon setting the diagnosis timing in step S58.

Referring to FIG. 7, the diagnosis timing represented by the vertical axis may be set on the basis of a time during which the charging is actually performed, i.e., on the basis of the charged time. The diagnosis timing tends to be more accelerated as the charged time is longer. In some embodiments where the diagnosis timing is set on the basis of an elapsed time from the turning off of the ignition switch 500 (i.e., from the time t0), the elapsed time may be made shorter as the charged time becomes longer. The malfunction determining threshold may similarly be set to a smaller value as the charged time becomes longer.

Thereafter, in step S59, whether the diagnosis timing determined in step S58 is satisfied may be determined. In some embodiments, whether the soaking is performed for a predetermined elapsed time from the turning off of the ignition switch 500 (i.e., from the time t0) may be determined. If the diagnosis timing is determined as being satisfied (step S59: YES), the process may proceed to step S54. In step S54, the temperature comparison diagnosis of the temperature sensors 110 and 120 may be performed. If the diagnosis timing is determined as being not satisfied (step S59: NO), the process may proceed to step S62. In step S62, the temperature comparison diagnosis may not performed for a current routine, and the execution of the diagnosis may be kept on standby until the diagnosis timing is satisfied. The process may end (END) after step S54 or S62.

If the charging of the high-voltage battery 800 is determined in step S42 as not being started (step S42: NO), the process may proceed to step S60 without driving the pump 300. In step S60, whether the soaking is performed for a predetermined time or longer may be determined. If the soaking is determined as being performed for the predetermined time or longer (step S60: YES), the process may proceed to step S54. In step S54, the temperature comparison diagnosis of the temperature sensors 110 and 120 may be performed. If the soaking is determined as being not performed for the predetermined time or longer (step S60: NO), the process may proceed to step S62. In step S62, the execution of the diagnosis may be kept on standby. The process may end (END) after step S54 or S62.

In some embodiments, a time at which the vehicle is to be operated next time may be estimated from setting of charging based on a timer set by a user's operation, and the pump 300 may be driven in consideration of the estimated time to thereby suppress electric power to be supplied from the electrical system.

According to at least one embodiment of the technology, it is therefore possible to accelerate the convergence of the detection value of any temperature sensor and to perform the malfunction diagnosis of any temperature sensor in an optimal fashion.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The ECU 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 400 illustrated in FIG. 1.

The invention claimed is:

1. A temperature sensor malfunction diagnosis apparatus to be provided in a vehicle that includes a device, a refrigerant circuit, an electric pump, a battery, and a temperature sensor,
   the refrigerant circuit being configured to circulate a refrigerant through the device,
   the electric pump being provided in the refrigerant circuit,
   the battery being configured to be charged after stopping of driving of the vehicle,
   the temperature sensor being configured to measure a temperature of the device,
   the temperature sensor malfunction diagnosis apparatus being configured to diagnose malfunction of the temperature sensor and comprising:
      a pump driver configured to drive the electric pump after the stopping of the driving of the vehicle; and
      a malfunction diagnosis unit configured to perform a malfunction diagnosis of the temperature sensor on a condition that a charged time reaches a temperature converging time of the temperature sensor while the electric pump is driven, the charged time being a time during which charging of the battery is performed from a start of the charging of the battery.

2. The temperature sensor malfunction diagnosis apparatus according to claim 1, wherein the malfunction diagnosis unit is configured to perform the malfunction diagnosis after a predetermined time has elapsed in a case where the charging of the battery is discontinued before the charged time reaches the temperature converging time, the predetermined time being longer than the temperature converging time.

3. The temperature sensor malfunction diagnosis apparatus according to claim 1, wherein the malfunction diagnosis unit is configured to acquire data on an ambient temperature, and set the temperature converging time to a shorter time as the ambient temperature is higher.

4. The temperature sensor malfunction diagnosis apparatus according to claim 1, wherein the charging performed after the stopping of the driving of the vehicle comprises charging of the battery on a basis of electric power supplied from outside of the vehicle.

5. The temperature sensor malfunction diagnosis apparatus according to claim 1, further comprising a diagnosis timing setting unit configured to set a diagnosis timing on a basis of the charged time in a case where the charging of the battery is discontinued before the charged time reaches the temperature converging time, the diagnosis timing being a timing at which the malfunction diagnosis is to be started.

6. The temperature sensor malfunction diagnosis apparatus according to claim 5, wherein the diagnosis timing setting unit is configured to set the diagnosis timing earlier as the charged time is longer.

7. The temperature sensor malfunction diagnosis apparatus according to claim 1, further comprising a malfunction determining threshold setting unit, wherein
   a plurality of the temperature sensors is provided in the vehicle,
   the malfunction diagnosis unit is configured to perform the malfunction diagnosis on a basis of a difference between detection values obtained by the respective temperature sensors and on a basis of a malfunction determining threshold, and
   the malfunction determining threshold setting unit is configured to set the malfunction determining threshold on a basis of the charged time in a case where the charging of the battery is discontinued before the charged time reaches the temperature converging time.

8. The temperature sensor malfunction diagnosis apparatus according to claim 7, wherein the malfunction determining threshold setting unit is configured to set the malfunction determining threshold to a smaller value as the charged time is longer.

9. The temperature sensor malfunction diagnosis apparatus according to claim 1, wherein the pump driver is configured to drive the electric pump on a condition that a chargeable time is equal to or longer than the temperature converging time after the stopping of the driving of the vehicle, the chargeable time being a time during which the charging of the battery is continuable.

10. The temperature sensor malfunction diagnosis apparatus according to claim 9, wherein the malfunction diagnosis unit is configured to perform the malfunction diagnosis after a predetermined time has elapsed in a case where the chargeable time fails to satisfy the temperature converging time, the predetermined time being longer than the temperature converging time.

11. The temperature sensor malfunction diagnosis apparatus according to claim 9, wherein the malfunction diagnosis unit is configured to perform the malfunction diagnosis after a predetermined time has elapsed in a case where the charging of the battery is discontinued before the charged time reaches the temperature converging time, the predetermined time being longer than the temperature converging time.

12. The temperature sensor malfunction diagnosis apparatus according to claim 9, wherein the malfunction diagnosis unit is configured to acquire data on an ambient temperature, and set the temperature converging time to a shorter time as the ambient temperature is higher.

13. The temperature sensor malfunction diagnosis apparatus according to claim 9, wherein the charging performed after the stopping of the driving of the vehicle comprises charging of the battery on a basis of electric power supplied from outside of the vehicle.

14. The temperature sensor malfunction diagnosis apparatus according to claim 9, further comprising a diagnosis timing setting unit configured to set a diagnosis timing on a basis of the charged time in a case where the charging of the battery is discontinued before the charged time reaches the temperature converging time, the diagnosis timing being a timing at which the malfunction diagnosis is to be started.

15. The temperature sensor malfunction diagnosis apparatus according to claim 14, wherein the diagnosis timing setting unit is configured to set the diagnosis timing earlier as the charged time is longer.

16. The temperature sensor malfunction diagnosis apparatus according to claim 9, further comprising a malfunction determining threshold setting unit, wherein
    a plurality of the temperature sensors is provided in the vehicle,
    the malfunction diagnosis unit is configured to perform the malfunction diagnosis on a basis of a difference between detection values obtained by the respective temperature sensors and on a basis of a malfunction determining threshold, and
    the malfunction determining threshold setting unit is configured to set the malfunction determining threshold on a basis of the charged time in a case where the charging of the battery is discontinued before the charged time reaches the temperature converging time.

17. The temperature sensor malfunction diagnosis apparatus according to claim 16, wherein the malfunction determining threshold setting unit is configured to set the malfunction determining threshold to a smaller value as the charged time is longer.

18. A temperature sensor malfunction diagnosis method comprising:
    driving an electric pump after stopping of driving of a vehicle, the electric pump being provided in a refrigerant circuit that is configured to circulate a refrigerant through a device; and
    performing a malfunction diagnosis of a temperature sensor on a condition that a charged time reaches a temperature converging time of the temperature sensor while the electric pump is driven, the temperature sensor being configured to measure a temperature of the device, and the charged time being a time during which charging of a battery serving as a power supply of the electric pump is performed from a start of the charging of the battery.

19. A temperature sensor malfunction diagnosis apparatus provided in a vehicle that includes a device, a refrigerant circuit, an electric pump, a battery, and a temperature sensor, and configured to diagnose malfunction of the temperature sensor,
    the refrigerant circuit being configured to circulate a refrigerant through the device,
    the electric pump being provided in the refrigerant circuit,
    the battery being configured to be charged after stopping of driving of the vehicle,
    the temperature sensor being configured to measure a temperature of the device,
    the temperature sensor malfunction diagnosis apparatus comprising circuitry configured to
        drive the electric pump after the stopping of the driving of the vehicle, on a basis of the battery as a power supply, and
        perform a malfunction diagnosis of the temperature sensor on a condition that a charged time reaches a temperature converging time of the temperature sensor while the electric pump is driven, the charged time being a time during which charging of the battery is performed from a start of the charging of the battery.

\* \* \* \* \*